(12) United States Patent
Yin et al.

(10) Patent No.: US 8,767,849 B2
(45) Date of Patent: Jul. 1, 2014

(54) METHOD AND DEVICE FOR INTER-CHIP AND INTER-ANTENNA INTERFERENCE CANCELLATION

(75) Inventors: Bei Yin, Houston, TX (US); Kiarash Amiri, Bellevue, WA (US); Joseph R. Cavallaro, Pearland, TX (US); Yuanbin Guo, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 89 days.

(21) Appl. No.: 13/405,134

(22) Filed: Feb. 24, 2012

(65) Prior Publication Data

US 2012/0219051 A1    Aug. 30, 2012

Related U.S. Application Data

(60) Provisional application No. 61/446,543, filed on Feb. 25, 2011.

(51) Int. Cl.
| | | |
|---|---|---|
| *H04K 1/10* | (2006.01) | |
| *H04L 27/28* | (2006.01) | |
| *H04L 25/03* | (2006.01) | |
| *H04J 11/00* | (2006.01) | |
| *H04B 1/7107* | (2011.01) | |

(52) U.S. Cl.
CPC ......... *H04J 11/004* (2013.01); *H04L 25/03159* (2013.01); *H04B 1/71072* (2013.01)
USPC ........... 375/260; 375/229; 375/346; 375/349; 375/350

(58) Field of Classification Search
USPC .................................. 375/229–236, 346–350
See application file for complete search history.

(56) References Cited

U.S. PATENT DOCUMENTS

| | | | | |
|---|---|---|---|---|
| 2003/0231702 | A1* | 12/2003 | Oates et al. | 375/148 |
| 2006/0221809 | A1* | 10/2006 | Malladi et al. | 370/206 |
| 2008/0219374 | A1* | 9/2008 | Fernandez-Corbaton et al. | 375/267 |
| 2009/0092182 | A1* | 4/2009 | Shin et al. | 375/232 |
| 2011/0002232 | A1 | 1/2011 | Niewczas et al. | |
| 2011/0261872 | A1* | 10/2011 | Wang et al. | 375/227 |

OTHER PUBLICATIONS

Berardinelli, G., et al., "Improving SC-FDMA Performance by Turbo Equalization in UTRA LTE Uplink," 2008, pp. 2557-2561, IEEE.
Berardinelli, G., et al., "Turbo Receivers for Single User MIMO LTE-A Uplink," 2009, pp. 1-5, IEEE.
Bottomley, G.E., et al., "A Generalized RAKE Receiver for Interference Suppression," Journal on Selected Areas in Communications, Aug. 2000, pp. 1536-1545, vol. 18, No. 8, IEEE.
Guo, Y., et al., "An Efficient Circulant MIMO Equalizer for CDMA Downlink: Algorithm and VLSI Architecture," EURASIP Journal on Applied Signal Processing, 2006, pp. 1-26, vol. 2006, Article ID 57134, Hindawi Publishing Corporation.

(Continued)

*Primary Examiner* — Curtis Odom
(74) *Attorney, Agent, or Firm* — Slater & Matsil, L.L.P.

(57) ABSTRACT

A wireless receiver is constructed to equalize a time-domain received signal, detect a plurality of symbols of the equalized time-domain received signal, and perform interference cancellation on the time-domain received signal. The interference cancellation can be performed using a partial result produced by an IDFT, and may use only neighboring symbols in a detected plurality of symbols. The resulting wireless receiver can be constructed to operate efficiently under a plurality of wireless standards.

24 Claims, 9 Drawing Sheets

(56) References Cited

OTHER PUBLICATIONS

Jiang, M., et al., "Design of High Performance MIMO Receivers for LTE/LTE-A Uplink," Signals, Systems and Computers (ASILOMAR), 2010 Conference Record of the Forty Fourth Asilomar Conference, Nov. 2010, pp. 1493-1497, IEEE.
Karakaya, B., et al., "Channel Estimation for LTE Uplink in High Doppler Spread," 2008, pp. 1126-1130, IEEE.
Li, Y., et al., "UMTS FDD Frequency Domain Equalization Based on Self Cyclic Reconstruction," International Conference on Communications, 2005, pp. 2122-2126, vol. 3, IEEE.
Martoyo, I., et al., "Low Complexity CDMA Downlink Receiver Based on Frequency Domain Equalization," 8th Vehicular Technology Conference, 2003, pp. 987-991, vol. 2, IEEE.
Melvasalo, M., et al., MMSE equalizer and chip level inter-antenna interference canceler for HSDPA MIMO systems, 63rd Vehicular Technology Conference, 2006, pp. 2008-2012, IEEE.
Okuyama, S., et al., "Iterative MMSE Detection and Interference Cancellation for Uplink SC-FDMA MIMO Using HARQ," International Conference on Communications (ICC), 2011, pp. 1-5, IEEE.
Pan, Z., et al., "Practical Soft-SIC Detection for MIMO SC-FDMA System with Co-Channel Interference," 2010, pp. 1-5, IEEE.
Purkovic, A., et al., "Turbo Equalization in an LTE Uplink MIMO Receiver," the 2011 Military Communications Conference—Track 1—Waveforms and Signal Processing, 2011, pp. 489-494, IEEE.
Ren, L., et al., "An Improved Frequency-Domain Interference Cancellation with DFE for CDMA," 68th Vehicular Technology Conference, 2008, pp. 1-4, IEEE.
Schniter, P., "Linear and Decision Feedback Equalization Structures for Asynchronous DS-CDMA under ICI," pp. 1-17, 1998.
Takeda, K., et al., "Frequency-Domain Interchip Interference Cancelation for DS-CDMA Downlink Transmission", Transactions on Vehicular Technology, May 2007, pp. 1286-1294, vol. 56, No. 3, IEEE.
Takeda, K., et al., "Downlink DS-CDMA Transmission with Joint MMSE Equalization and ICI Cancellation," Vehicular Technology Conference, 2006, pp. 1-5, IEEE.
Takeda, K., et al., "Inter-chip Interference Cancellation for DS-CDMA with Frequency-domain Equalization," Vehicular Technology Conference, Sep. 2004, pp. 1-5, IEEE.
Wang, X., et al., "Iterative (Turbo) Soft Interference Cancellation and Decoding for Coded CDMA," Transactions on Communications, 1999, pp. 1046-1061, vol. 47, No. 7, IEEE.
Yang, J., et al., "Tentative Chip Decision-Feedback Equalizer for Multicode Wideband CDMA," Transactions on Wireless Communications, 2005, pp. 137-148, vol. 4, No. 1, IEEE.
Zhu, Y., et al., "Single-Carrier Frequency-Domain Equalization with Decision-Feedback Processing for Time-Reversal Space-Time Block-Coded Systems," Transactions on Communications, Jul. 2005, pp. 1127-1131, vol. 53, No. 7, IEEE.

\* cited by examiner

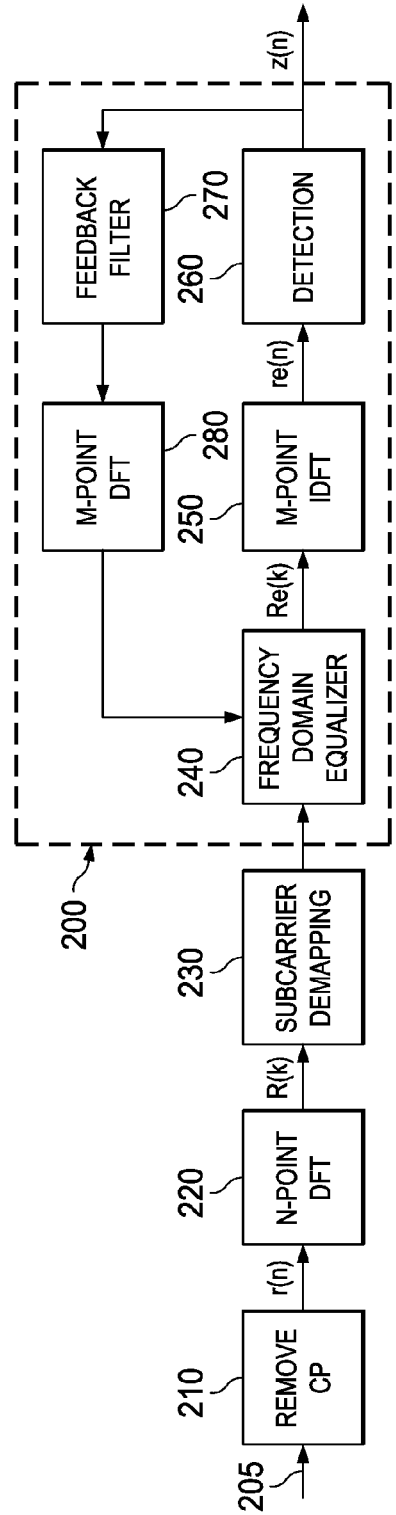
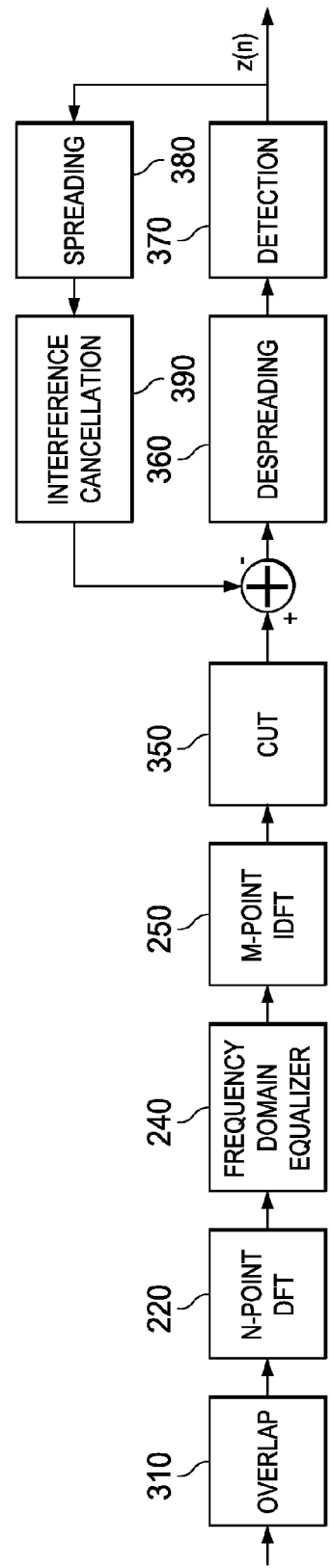

METHOD AND DEVICE FOR INTER-CHIP AND INTER-ANTENNA INTERFERENCE CANCELLATION

This application claims the benefit of U.S. Provisional Application No. 61/446,543 filed on Feb. 25, 2011, entitled "Method and Device for Interchip and Interantenna Interference Cancellation," which application is hereby incorporated herein by reference.

TECHNICAL FIELD

The present invention relates to communications devices and methods, and in particular embodiments, to a method and device for inter-chip and inter-antenna interference cancellation, for example with a Universal Mobile Telecommunications System or Long Term Evolution ("UMTS" or "LTE") receiver.

BACKGROUND

A cellular network is a radio network distributed over land areas called cells, each cell served by at least one fixed-location transceiver known as a cell site or base station. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

The 3rd Generation Partnership Project® ("3GPP") LTE provides a standard in the mobile network technology tree that produced the Global System for Mobile Communications with Enhanced Data rates for GSM Evolution ("GSM/EDGE") and UMTS/HSPA ("High Speed Packet Access") network technologies. It is a project of the 3GPP, operating under a name trademarked by one of the associations within the partnership, the European Telecommunications Standards Institute. LTE Advanced ("LTE-A"), a fourth generation standard ("4G") of radio technologies, is designed to increase the capacity and speed of mobile telephone networks. LTE Advanced is backwards compatible with LTE and uses the same frequency bands, while LTE is not backwards compatible with third generation ("3G") standards.

A frequency domain equalizer ("FDE") receiver is used in LTE. It can also be used in a multi-mode receiver supporting both LTE and UMTS. However, in an FDE receiver, performance degrades, particularly in an equal taps channel where the channel has a frequency null. Usually a decision feedback equalizer ("DFE") is used to improve receiver performance. However, this problem is unresolved in a multi-mode receiver. Because of the use of a spreading factor in UMTS systems that is employed to convert symbols into chips, decision feedback for a detected symbol cannot be applied as straightforwardly as in LTE systems. Thus, what is needed in the art is an efficient receiver structure that can be used for both LTE and UMTS systems.

SUMMARY

Technical advantages are generally achieved by embodiments of the present invention which provide an apparatus and method to construct and operate a wireless receiver.

In accordance with an example embodiment, a method and a related apparatus for operating a wireless receiver includes equalizing a time-domain received signal, detecting symbols of the equalized time-domain received signal, and performing interference cancellation on the time-domain received signal using the detected symbols. The interference cancellation can use a partial result produced by an IDFT.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates a block diagram of an FDE receiver configured to receive an LTE signal with decision feedback, illustrating a receiver structure for application of the principles of an embodiment;

FIG. 3 illustrates a block diagram of an FDE receiver for UMTS systems, illustrating a receiver structure with decision feedback in the frequency domain for application of the principles of an embodiment;

An element in a later figure similar to an element in an earlier figure with the same reference number will generally not be redescribed in the interest of brevity.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Generalized RAKE ("G-RAKE") receivers for UMTS systems are used in current base stations. In LTE systems, an FDE receiver is used in base stations. Traditionally, in order to support both standards, a G-RAKE receiver and an FDE receiver are both included in a base station. This results in large silicon die area and high power consumption due to a lack of reuse of common modules in both systems. If a base station is enabled to operate under one standard, enabling a receiver to operate under the other standard will generally be wasteful of silicon die area, power consumption, and expense.

Recently, an FDE-based receiver was proposed for UMTS uplink as well as to facilitate more efficient integration of multi-mode receivers supporting both UMTS and LTE standards, either simultaneously or through off-line configuration in a software defined radio ("SDR") system on chip ("SoC") platform composed of a set of digital signal processor ("DSP") cores and hardware accelerators. This multi-mode receiver can save a lot of silicon die area. It also has better performance for UMTS uplink receiver compared to G-RAKE in UMTS, especially for high data rate services, such as High Speed Uplink Packet Access ("HSUPA"). Theoretically, FDE is equivalent to its time-domain counterpart, a least minimum mean-square error ("LMMSE") equalizer. It works by restoring the orthogonality of the HSUPA shared data channels, especially when the spreading gain is very short for high data rate modes.

Figure 1:
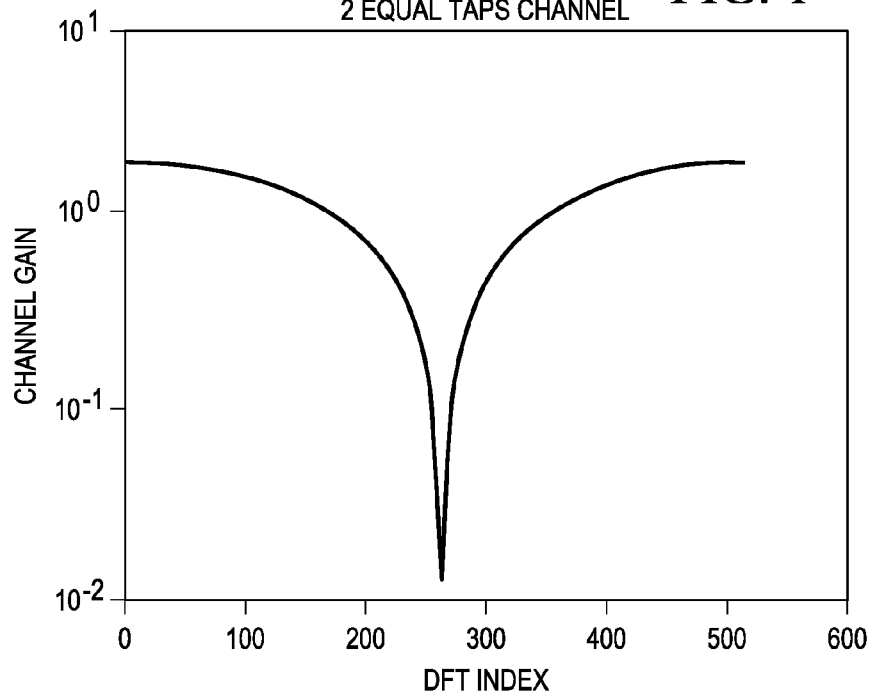
FIG. 1 illustrates an example frequency response of a channel with two equal taps.

However, there is an inherent problem with this receiver for FDE. Receiver performance employing FDE degrades significantly in an equal taps channel. As an example, the frequency response of a channel with two equal taps is shown in FIG. 1. A frequency null in the middle of the graph can be seen, which makes it very difficult for a receiver employing FDE to perform well.

During the last few years, some techniques have been proposed to improve receiver performance in an equal taps channel. For example, some techniques perform inter-chip interference cancellation in the frequency domain. These processes require an additional DFT (or FFT) to convert the chip back to the frequency domain and then perform interference cancellation, which increases latency and complexity. Another limitation is these methods are designed for SISO systems or single input/multi-output ("SIMO") systems, not for multi-input/multi-output ("MIMO") systems. Different from these, as introduced herein, both inter-chip and inter-antenna cancellation are performed for MIMO system with lower feedback latency and less complexity.

Turning now to FIG. 2, illustrated is a block diagram of an FDE receiver configured to receive an LTE signal with decision feedback in the frequency domain, illustrating a receiver structure for application of the principles of an embodiment. DFE can be used to improve performance of FDE, especially in a channel with equal taps. A sequence of complex time-domain symbols, e.g., 16-quadrature amplitude modulated ("16 QAM") symbols, is received at the receiver input 205. The sequence of complex time-domain symbols is produced by a transmitter wherein a binary data source is modulated onto a carrier with code division multiple access ("CDMA") spreading, a cyclic prefix ("CP") is added, and the resulting signal is transmitted over a wireless radio channel.

At the receiver, the CP is removed from the sequence of complex time-domain symbols 205 in block 210. The received discrete signal r(n) is passed to an N-point DFT 220. Each DFT output sample R(k) is subcarrier demapped in block 230. Blocks 210 and 230 are employed for signals in LTE systems. Employing DFE in the group of blocks 200, a detected symbol is inputted to a feedback filter to cancel an incoming symbol. The subcarrier-demapped sample is multiplied in frequency domain equalizer 240 by a complex coefficient E(k) of a multiplier vector E, which is derived from an inverse of a channel impulse response, to produce an equalized signal Re(k). An M-point IDFT 250 (where M can be equal to N) transforms the equalized signal Re(k) back to the time domain to produce an equalized time-domain signal re(n). Channel equalization is thus performed as a deconvolution process in the frequency domain as a complex multiplication operation. Symbols are then detected from the equalized time-domain signal re(n) in detection block 260 to produce detected symbols z(n). The detected symbols are filtered in the feedback filter block 270, and an M-point DFT is performed in block 280 to transform the filtered detected symbols back into the frequency domain. The transformed symbols are subtracted from the previously processed symbols in the frequency-domain equalizer 240. The process is repeated one or more times to refine detection of the symbols z(n). Iterative detection in block 260 with frequency-domain feedback in block 270 is thus performed. Successive interference cancellation can be achieved by subtracting a strongest signal from a signal of interest.

However, in a multi-mode receiver, because of the use of spreading in UMTS systems, the decision feedback cannot be applied straightforwardly.

Turning now to FIG. 3, illustrated is block diagram of an FDE receiver for UMTS systems illustrating another receiver structure with decision feedback in the frequency domain for application of the principles of an embodiment. In the receiver, overlap and cut can be used with FDE in UMTS receivers. A despreading module collects a sequence of chips and converts them into one symbol. The despreading module makes DFE hard to be applied in UMTS receivers.

The receiver illustrated in FIG. 3 includes, respectively, overlap and cut processes 310 and 350. A sequence of Q>N received complex time-domain chips, e.g., 1012 chips is presented at the input of overlap block 310. To perform overlap and cut, a DFT process is performed on overlapping sliding windows of N+2p symbols, where p denotes the length, e.g., p=300, of "prelap" and "postlap" detection windows. Detected 2p symbols at the edges of each window are discarded in the cut block 350 before despreading. An equalized chip sequence is produced at the output of cut block 350. The first and the last p chips are discarded before despreading and detection. Only a middle part of the chip sequence produced by the M-point IDFT is retained, e.g., the middle 512 chips. Symbols detected in block 370 are re-spread in block 380 back to the chip level so that interference cancellation can be performed in block 390. Block 390 performs adjacent user signal spectra overlap and multi-user interference cancellation. After estimating received signals from a plurality of antennas, a signal from a first antenna is re-estimated after canceling interference in block 390 from all other antennas which can be repeated for all antennas. Interference cancellation can be performed repeatedly, e.g., a second or third time.

Figure 4:
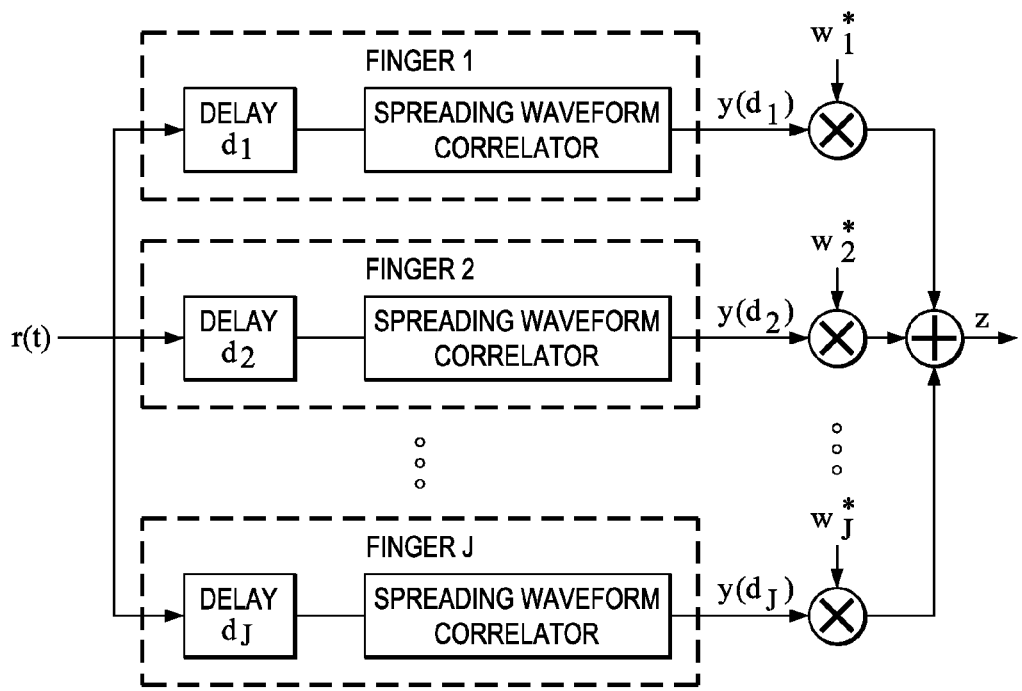
FIG. 4 illustrates a block diagram showing a RAKE receiver structure for a UMTS signal, illustrating receiver structure for application of the principles of an embodiment.

Turning now to FIG. 4, illustrated is a block diagram showing a RAKE receiver structure for a UMTS signal, illustrating receiver structure for application of the principles of an embodiment. A RAKE receiver carries out maximum ratio combining and exploits multipath diversity. The input r(t) is an unequalized chip signal. The output is equalized chip signal z. A RAKE receiver structure is formed with a bank of RAKE fingers, each correlating to a different delay component of a delay vector $d=[d_j]$ of an unequalized received signal r(t). The finger outputs are combined to form a decision statistic z. For a given symbol of interest, e.g., a symbol 0 of a user 0, the spreading waveform correlator at each finger is used to despread the spread spectrum signal resulting in a vector of despread values $y=[y(d_j)]$. These despread values are combined using a vector of combining coefficients $w=[w_j]$ to produce a decision statistic (an equalized chip signal) $z=w^H \cdot y$. The number of fingers, the finger delays, and the combining weights are design parameters. The resulting receiver is referred to as a generalized RAKE (G-RAKE)

receiver since it has the same structure as a conventional RAKE receiver, but with different delays and weights.

As UMTS and LTE/LTE-A evolve in parallel, the reconfigurability of a receiver to support multiple standards has become more important, especially for small cells. A reconfigurable multi-standard uplink MIMO receiver based on a frequency domain equalizer is introduced herein. To improve the performance, two low-complexity partial iterative interference cancellation (IC) processes are now described to deal with the residual inter-chip and inter-antenna interference in HSPA/HSPA+ and the residual inter-symbol and inter-antenna interference in LTE/LTE-A. Compared with a receiver consisting of separate HSPA/HSPA+ and LTE/LTE-A uplink receivers, the reconfigurable receiver can save up to 66.9% complexity. Moreover, the two partial interference cancellation ("IC") processes have negligible performance loss compared with full IC process. They can achieve 2 dB gain in signal-to-noise ratio ("SNR") in both standards with only 15.2% additional complexity to a process with no IC.

LTE/LTE-A has been proposed to support up to 1 Gbps in the downlink and 500 Mbps in the uplink. At the same time, HSPA/HSPA+ is also being advocated to support up to 672 Mbps in a downlink and 70 Mbps in an uplink. Because both standards coexist and evolve in parallel, it becomes more and more important for receivers to support multiple standards while maintaining low complexity, especially for small cells.

Time domain equalized ("TDE") receivers have been used in HSPA/HSPA+ UMTS base stations. On the other hand, frequency domain equalized ("FDE") receivers are used in LTE/LTE-A base stations. Simply putting HSPA/HSPA+ and LTE/LTE-A uplink receivers together results in a complicated receiver. The reason is that with the lack of commonality in TDE and FDE, it is hard to reduce the complexity of algorithm and architecture. It is understood that FDE can be applied to the UMTS downlink without changing the current UMTS transmitter. Overlap-cut and cyclic reconstruction have been discussed, and both can produce good receiver performance. However, compared with cyclic reconstruction, overlap-cut has less complexity because it does not perform a matrix inversion. In an embodiment, a reconfigurable multi-standard uplink MIMO receiver is structured by combining an HSPA/HSPA+ uplink with an LTE/LTE-A uplink. The reconfigurable receiver can be formed with up to 66.9% less complexity than a receiver formed with separate HSPA/HSPA+ and LTE/LTE-A uplink receivers, which reduces silicon area and power consumption.

In multi-tap channels, however, the residual interference of FDE degrades receiver performance. IC can be used to mitigate this effect. Because of the spreading factor, IC is performed at the chip level in HSPA/HSPA+, while it works at the symbol level in LTE/LTE-A. A number of IC processes have been proposed, but only a few are for FDE and none is for multi-standard receivers. For example, all possible combinations of current symbols are generated. For N current symbols with binary phase shift keying ("BPSK"), the receiver lists up to $2^N$ combinations, resulting in high complexity. After being applied to FDE, conventional IC arrangements do not have low complexity. IC can also be performed in the frequency domain for UMTS. This means extra DFTs are used to convert the feedback signal to the frequency domain, which results in more complexity and significantly larger latency of the feedback signal. A similar issue occurs in LTE/LTE-A. All of these receiver arrangements either are highly complex or have large latency for a real-time implementation.

To perform low-complexity IC for a multi-standard receiver, an embodiment employs two partial iterative IC processes. In HSPA/HSPA+, two processes spread detected symbols into detected chips, regenerate interference from part of these chips, and perform inter-chip and inter-antenna IC. In LTE/LTE-A, these processes regenerate interference from part of the detected symbols and perform inter-symbol and inter-antenna IC. Compared with other receiver structures, embodiments cancel only part of the interference instead of all of it. Furthermore, IC of an embodiment does not use extra DFTs for the feedback signal, which result in less complexity and latency. Embodiments have negligible performance loss compared with full IC, and embodiments can produce up to 2 dB signal-to-noise gain in both HSPA/HSPA+ and LTE/LTE-A, and only add 15.2% complexity to a reconfigurable multi-standard receiver without IC.

Figure 5:
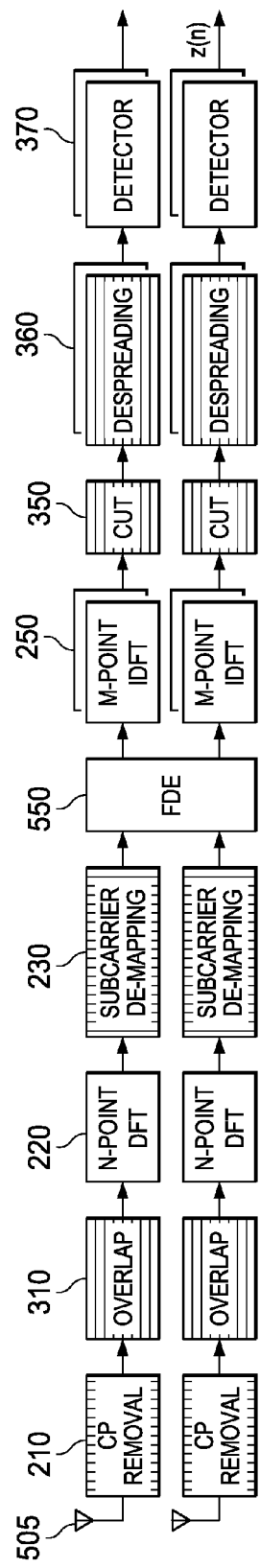
FIG. 5 illustrates a reconfigurable multi-standard receiver for an HSPA/HSPA+ UMTS and LTE/LTE-A uplink, illustrating a receiver structure for application of the principles of an embodiment.

Turning now to FIG. 5, illustrated is a reconfigurable multi-standard receiver for an HSPA/HSPA+ UMTS and LTE/LTE-A uplink, illustrating a receiver structure for application of the principles of an embodiment. The receiver is operable for a spatial multiplexing MIMO system with $N_T$ transmitter antennas and $N_R$ receiver antennas. A wireless signal is received at one of possibly plural antennas, such as antenna 505. Shaded modules marked by horizontal lines are unique to HSPA/HSPA+, and provide overlap, cut, and despreading functions. The shaded modules marked by vertical lines are unique to LTE/LTE-A, and include cyclic prefix ("CP") removal and subcarrier de-mapping. Non-shaded modules are shared by both standards. The overlap block 310 is employed for UMTS only. The cut and despreading blocks 350 and 360 are also employed for UMTS only. The input to the detection block 370 is UMTS symbols or LTE time-domain samples.

Because there is no CP in HSPA/HSPA+, overlap-cut is used with FDE. This structure is shown in FIG. 5. First, DFT is performed on a sequence of N received chips. Next, after FDE, the N equalized chips are converted to the time domain by an IDFT. Finally, the middle M chips of the sequence are retained, and (N−M)/2 chips from each side of the sequence are discarded because the middle section generally has fewer errors than edge regions.

By bypassing CP removal and subcarrier de-mapping modules, an embodiment of a receiver works in HSPA/HSPA+. The received chips y(t) at time t can be represented by equation (1)

$$y(t) = \sum_{i=0}^{L-1} h(i)x(t-i) + n(t), \qquad (1)$$

where y(t) is an $N_R \times 1$ vector of received chips at time t, and h(i) is an $N_R \times N_T$ time-domain channel matrix at tap i where the channel matrix h(i) (or H) is represented by equation (2):

$$h(i) = \begin{pmatrix} h_{1,1}(i) & \cdots & h_{1,N_T}(i) \\ \vdots & \ddots & \vdots \\ h_{N_R,1}(i) & \cdots & h_{N_R,N_T(i)} \end{pmatrix}; \qquad (2)$$

L is the length of the channel, x(t−i) is an $N_T \times 1$ vector of transmitted chips at time t−i, n(t) is an $N_R \times 1$ vector of additive white Gaussian noise with zero mean and variance $\sigma^2$ at time t; $h_{n_r,n_t}(i)$ is the coefficient of the channel from transmitter antenna $n_t$ to receiver antenna $n_r$ at tap i.

Next, for each antenna, DFT converts N chips selected by the overlap module to the frequency domain. The converted chips from all antennas are Y.

By assuming the channel is known by the receiver, Minimum Mean Square Error ("MMSE") FDE is applied (in block 550) to each subcarrier by equation (3) to produce equalized received chips/symbols $$Y_{eq}(n) = (H(n)^H H(n) + \sigma^2 I)^{-1} H(n)^H Y(n), \tag{3}$$

where $Y_{eq}(n)$ is an $N_R \times 1$ vector of equalized frequency domain chips on the $n^{th}$ subcarrier; $H(n)$ is an $N_R \times N_T$ frequency-domain channel matrix of the $n^{th}$ subcarrier; $Y(n)$ is an $N_R \times 1$ vector of the frequency domain chips on the $n^{th}$ subcarrier; $H(n)$ is an $N_R \times N_T$ frequency domain channel matrix of the $n^{th}$ subcarrier; $Y(n)$ is an $N_R \times 1$ vector of the frequency domain chips on the $n^{th}$ subcarrier; $n=1,\ldots,N$. An $N_T \times N_T$ equalized frequency domain channel matrix $H_{eq}(n)$ is computed by equation (4)

$$H_{eq}(n) = (H(n)^H H(n) + \sigma^2 I)^{-1} H(n)^H H(n). \tag{4}$$

Next each IDFT converts N equalized frequency domain chips and channel matrices to the time domain. The converted chips and channel matrices from all antennas are $y_{eq}$ and $h_{eq}$.

Later, the cut module for each antenna retains the middle M equalized time domain chips and discards (N−M)/2 chips from each side. Finally, the kept chips are despread to symbols by the corresponding spreading factor of each user, and symbols are detected.

Because of the existence of CP in LTE/LTE-A, FDE can be applied directly. By bypassing overlap, cut, and despreading modules, an embodiment of a receiver works in LTE/LTE-A systems. The processing flow is similar to HSPA/HSPA+ described previously hereinabove.

First, symbols y(t) are received as represented by equation (1). Then CP is removed from $N+N_{CP}$ received symbols for each antenna, where $N_{CP}$ is the number of CP symbols. After that, DFT for each antenna converts N retained symbols to the frequency domain. Next, frequency domain symbols are mapped to different users in the subcarrier de-mapping module, and MMSE-FDE is applied as in equation (3) to each frequency subcarrier. Finally, for each user, M equalized frequency domain symbols are converted to the time domain by IDFT and then detected.

By using FDE, an embodiment of a reconfigurable multi-standard uplink MIMO receiver exploits similarities between HSPA/HSPA+ and LTE/LTE-A uplink receivers. Modules having high complexity are shared: FDE, DFT, IDFT, and a detector. Sharing results in lower complexity. Although there are some unique modules for different standards, such as overlap, cut, despreading, CP removal, and subcarrier de-mapping modules, these modules have low complexity. These modules represent only a small percentage of the complexity of the receiver, as described hereinbelow.

In multi-tap channels, residual interference still exists after FDE which degrades performance. Residual interference is difficult to deal with in a multi-standard receiver.

To resolve the problem of residual interference in a multi-standard receiver without introducing substantial complexity, an embodiment employs two partial-iterative IC processes: partial single-chip IC ("SCIC") and partial multi-chip IC ("MCIC"). In HSPA/HSPA+, these processes cancel inter-chip and inter-antenna interference, while in LTE/LTE-A they cancel inter-symbol and inter-antenna interference. Instead of fully cancelling interference, embodiment processes cancel only part of it. Embodiments can exhibit the same receiver performance as one with full IC but with less complexity.

Figure 6:
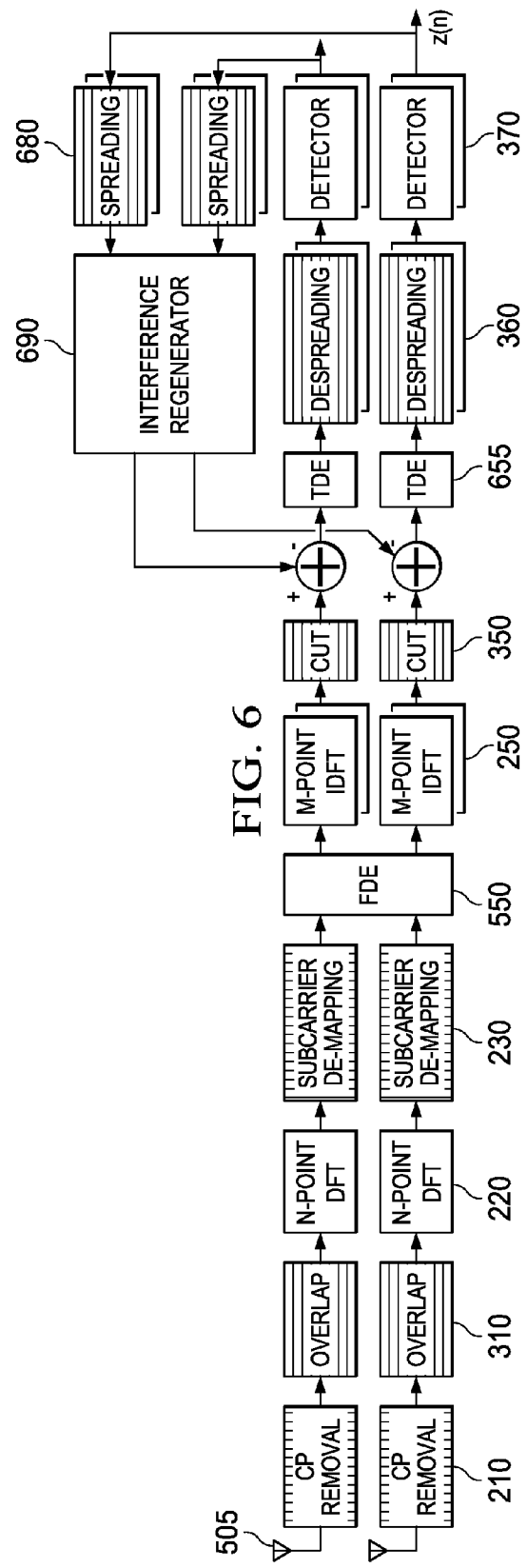
FIG. 6 illustrates a receiver architecture employing an iterative IC process, in accordance with an embodiment.
Figure 7:
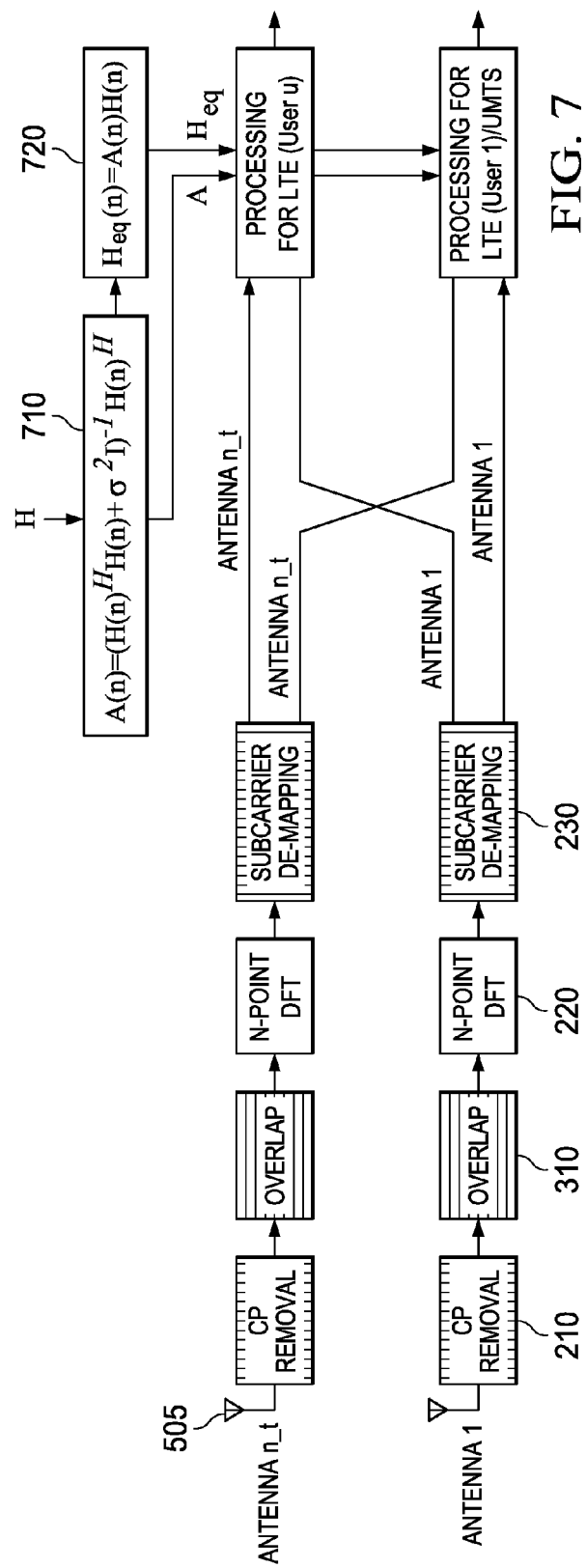
FIGS. 7 and 8 illustrate further structure of a receiver architecture employing partial-iterative IC processes, in accordance with an embodiment.
Figure 8:
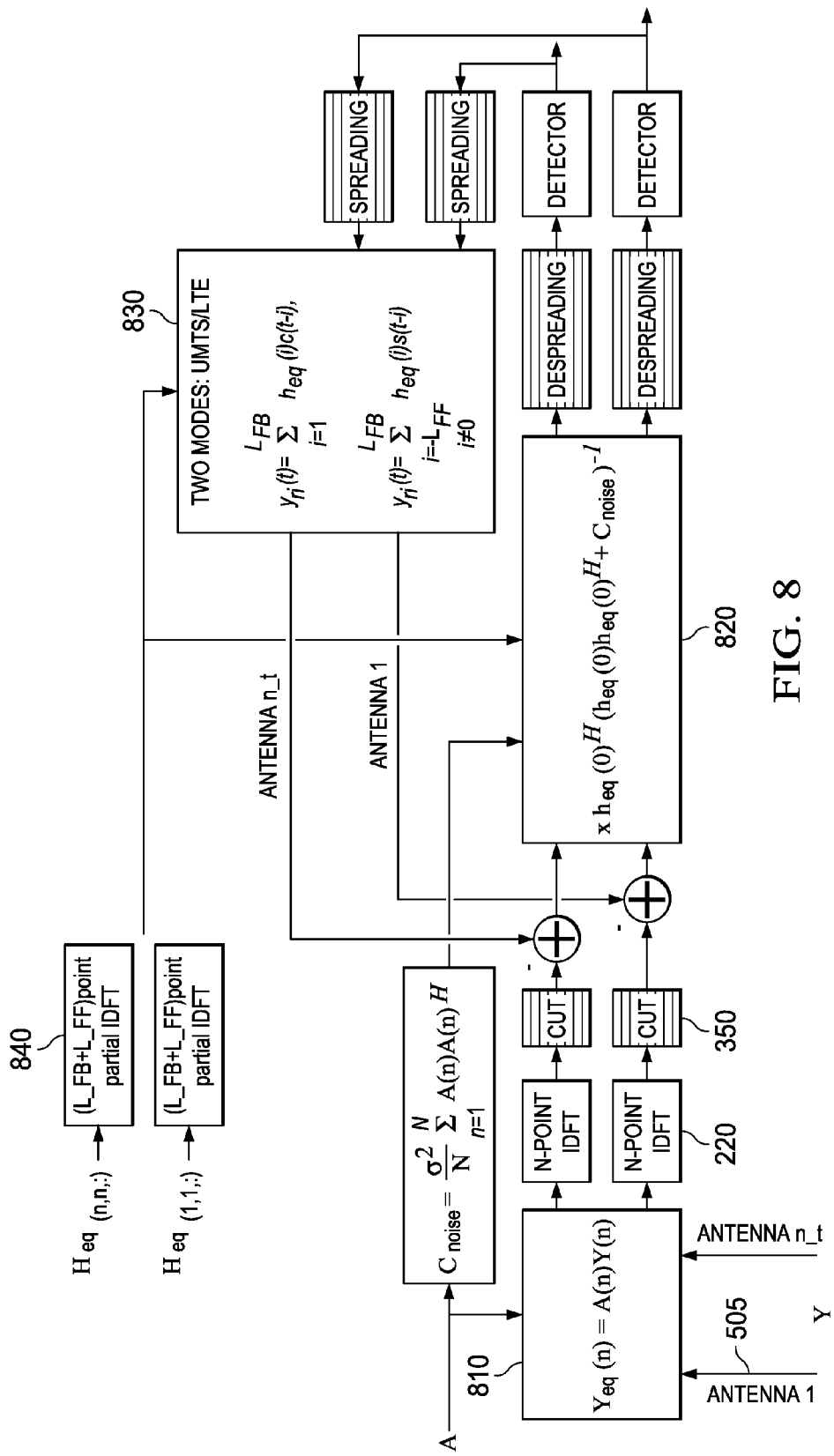

Turning now to FIG. 6, illustrated is a receiver architecture employing an iterative IC process, in accordance with an embodiment. The IC process performs equalization in the time domain, and can employ partial interference cancellation. The M-point IDFT can be configured to produce only partial time-domain data. Shaded modules marked by horizontal lines are unique to HSPA/HSPA+, and non-shaded modules are common for both standards. Although embodiments are operative in both standards, they are discussed separately herein to simplify the description. Further details of the receiver architecture shown in FIG. 6 are illustrated in FIGS. 7 and 8.

An embodiment of a receiver is constructed to receive a symbol formed under UMTS and LTE standards. A symbol represents a sequence of bits. A symbol formed under LTE standards is encoded as an element in a QAM constellation, such as four bits encoded in a 16 QAM constellation. A symbol formed under UMTS standards is also in a constellation, but different from LTE, is spread into chips for transmission. For either standard, a receiver can process a received encoded symbol using a correlation process to identify a nearest/most likely symbol as the detected symbol. A RAKE detector is usually used for UMTS.

In HSPA/HSPA+ in UMTS systems, the equalized received time-domain chips $y_{eq}(t)$ produced by block 655 are given by equation (5)

$$y_{eq}(t) = \sum_{i=j-N+1}^{j} h_{eq}(i) x(t-i) + n_{eq}(t), \tag{5}$$

where $y_{eq}(t)$ is an $N_T \times 1$ vector of equalized time domain chips at time t; j is equal to (t mod N); $h_{eq}(i)$ is an $N_T \times N_T$ equalized time domain channel matrix at tap i; $h_{eq}(N+i) = h_{eq}(i)$; $n_{eq}(t)$ is an $N_T \times 1$ vector of equalized time domain additive white Gaussian noise at time t.

After the cut module, Eq. (5) can be written as equation (6):

$$y_{eq}(t) = h_{eq}(0) x(t) + \sum_{i=1}^{M-1} h_{eq}(i) x(t-i) + n_{eq}(t). \tag{6}$$

The first term in the equation above represents the transmitted chips. The second term represents residual interference from the other $(M-1)N_T$ previous chips at all antennas. This second term can be minimized by regenerating the interference from $h_{eq}(i)$ and the detected chips. To minimize interference, two partial IC processes are employed in an embodiment.

When $N_T$ equalized time domain chips are processed, IC is performed as indicated by equation (7) to produce interference-cancelled received chips:

$$\begin{aligned} y_{ic}(t) &= f(y_{eq}(t) - y_{ri}(t)) \\ &= f(h_{eq}(0) x(t) + n_{eq}(t)), \end{aligned} \tag{7}$$

where $y_{ic}(t)$ is an $N_T \times 1$ vector of chips after IC at time t, and f is an $N_T \times N_T$ equalization matrix as described further later, and $y_{ri}(t)$ is an $N_T \times 1$ vector of regenerated interference at time t. The MMSE criterion is applied to $y_{ic}(t)$ by choosing the function f as represented by equation (8)

$$f = h_{eq}(0)^H (h_{eq}(0) h_{eq}(0)^H + C_{noise})^{-1}, \tag{8}$$

where $C_{noise}$ is the covariance of the equalized noise $n_{eq}(t)$, and the covariance of the equalized noise $C_{noise}$ is given by equation (9):

$$C_{noise} = E[n_{eq}(t) n_{eq}(t)^H]. \tag{9}$$

This can be calculated in the frequency domain by equation (10)

$$C_{noise} = \frac{\sigma^2}{N} \sum_{n=1}^{N} A(n)A(n)^H, \quad (10)$$

where A(n) is equalizer coefficient matrix defined by equation (11)

$$A(n) = (H(n)^H H(n) + \sigma^2 I)^{-1} H(n)^H. \quad (11)$$

Because A(n) has already been calculated in equation (4), computational complexity can be reduced.

Next, the despreading module of each user converts $y_{ic}(t)$ together with the rest of chips in the same symbol into a single symbol. The operable equation is equation (12)

$$y_s(p+1) = \frac{1}{L_{SF}} \sum_{i=1}^{L_{SF}} a(i) y_{ic}(pL_{SF} + i), \quad (12)$$

where $y_s(p+1)$ is the $p^{th}$ $N_T \times 1$ vector of symbols, $L_{SF}$ is the length of the spreading factor, and a(i) is the $i^{th}$ element of the spreading factor. At each time, $N_T$ chips are despread to $N_T N_U$ symbols, where $N_U$ is the number of users.

Next, symbols are detected at each user. After that, the detected symbols of all users are spread to chips for IC. At each time, $N_T N_U$ detected symbols are spread to $N_T$ chips.

Finally, the interference regenerator produces interference $y_{ri}(t)$ from detected chips at all antennas by equation (13)

$$y_{ri}(t) = \sum_{i=1}^{L_{FB}} h_{eq}(i) c(t-i), \quad (13)$$

where $L_{FB}$ is the number of previously detected chips used in the interference regenerator, and c(t−i) is an $N_T \times 1$ vector of detected chips at time (t−i). When $L_{FB}$=M−1, residual interference is regenerated from all previous M−1 chips, which is full regeneration. However, only the interference from neighbor chips is generally strong, and the interference from other chips is generally weak. By adjusting $L_{FB}$ to only cover strong interference, partial IC is performed. Complexity can be reduced without substantial receiver performance loss compared to a receiver with full regeneration. Since fewer detected chips are used for interference regeneration, less data needs to be stored.

Because the despreading module converts the chip at time t together with the chips in the same symbol to an undetected symbol, and if interference can be removed from all these chips, better performance can be achieved with more computation.

Based on this, partial MCIC is employed in an embodiment. At time t, MCIC cancels interference in all chips in the same symbol as represented by equation (14)

$$y_{ic}(t+j) = f(y_{eq}(t+j) - y_{ri}(t+j)) \quad (14)$$

$$= f(h_{eq}(0)x(t+j) + \sum_{i=1}^{j} h_{eq}(i)x(t+j-i) +$$

$$n_{eq}(t+j)),$$

where j=0, ..., (p+1)$L_{SF}$−t; and $y_{ri}(t+j)$ is given (for UMTS) by equation (15)

$$y_{ri}(t+j) = \sum_{i=j+1}^{L_{FB}} h_{eq}(i) c(t+j-i). \quad (15)$$

After this, equation (12) performs despreading.

In LTE/LTE-A, equalized time domain symbols of each user can be represented by the same equation as equation (5). However, without the cut module, equation (5) is rewritten as equation (16)

$$y_{eq}(t) = h_{eq}(0)x(t) + \sum_{\substack{i=j-M+1 \\ i \neq 0}}^{j} h_{eq}(i) x(t-i) + n_{eq}(t), \quad (16)$$

where $y_{eq}(t)$ is an $N_T \times 1$ vector of equalized time domain symbols at time t, j is equal to (t modM), $h_{eq}(i)$ is an $N_T \times N_T$ equalized time domain channel matrix at tap I, $h_{eq}(M+i)=h_{eq}(i)$, and $n_{eq}(t)$ is an $N_T \times 1$ vector of equalized time domain additive white Gaussian noise at time t. The first term in the equation represents the transmitted symbols. The second term represents residual interference from the other (M−1)$N_T$ symbols in the same IDFTs at all antennas. This term can be minimized by regenerating the interference from $h_{eq}(i)$ and the detected symbols. Because there is no spreading factor, the two IC processes in HSPA/HSPA+ become a single equivalent partial IC in LTE/LTE-A.

When $N_T$ equalized time domain symbols of each user arrive, IC is performed by equation (7). Next, without despreading, the symbols are directly detected.

Finally, the interference regenerator produces interference $y_{ri}(t)$ from the detected symbols at all antennas as represented by equation (17)

$$y_{ri}(t) = \sum_{\substack{i=-L_{FF} \\ i \neq 0}}^{L_{FB}} h_{eq}(i) s(t-i), \quad (17)$$

where $L_{FF}$ is the number of future detected symbols used in the interference regenerator. However, these symbols are not received in the future, but have already been received and buffered. When $L_{FB}+L_{FF}$=M−1, residual interference is regenerated from all other M−1 symbols in the same IDFT, which is full regeneration. As in HSPA/HSPA+, by adjusting $L_{FB}+L_{FF}$ to cover only strong interference, receiver complexity can be reduced without substantial performance loss, and less storage is needed.

Turning now to FIGS. 7 and 8, illustrated is an embodiment of a further architecture of the receiver illustrated in FIG. 6. In FIG. 7, block 710 produces the equalizer coefficient matrix A that is formed of the equalizer coefficients, and block 720 produces the equalized channel matrix $H_{eq}$ by multiplying the equalizer coefficient matrix A by the original channel matrix H(n).

In FIG. 8, block 810 performs frequency domain equalization on the received signal employing the equalizer coefficient matrix A. Block 820 performs time domain equalization. Block 830 computes interference cancellation signals employing equation (13), which is a generalized equation for UMTS signals, or equation (17), which is a generalized equation for LTE. Block 830 computes interference cancellation signals employing equation (15), which provides partial interference cancellation that can be specific to UMTS signals. Block 840 partially transforms the equalized channel matrix into the time domain.

As described hereinabove, the flow of partial IC in HSPA/HSPA+ systems is the same as in LTE/LTE-A systems. Although interference regeneration in equation (17) may appear to be different from that in equation (13), equation (17) becomes equation (13) when $L_{FF}=0$. Thus, a same interference regenerator can be reconfigured to support both standards.

The complexity of receivers is compared in Table 2, with parameters chosen as illustrated. Complexity is represented by the number of equivalent multiplications for 512 MIMO chips/symbols in HSPA/HSPA+ or LTE/LTE-A.

TABLE 2

| Number of equivalent multiplications for 512 MIMO chips/symbols | | | |
|---|---|---|---|
| Reconfigurable multi-standard receiver | 7150 | 14319 | 28791 |
| HSPA/HSPA+ & LTE/LTE-A receivers | 7671 | 22994 | 87037 |
| Ratio1 | 93.3% | 62.3% | 33.1% |
| Partial IC | 255 | 1045 | 4370 |
| Parallel FD IC | 3794 | 8788 | 22376 |
| Ratio2 = partial IC/parallel frequency domain IC | 6.7% | 11.9% | 19.5% |
| Ratio3 = partial IC/reconfigurable receiver | 3.6% | 7.3% | 15.2% |

The parameter Ratio1 in Table 2 indicates that when the size of MIMO increases, a reconfigurable receiver saves more complexity than a receiver with separate HSPA/HSPA+ and LTE/LTE-A uplink receivers. Table 2 also shows that an embodiment employing partial IC can reduce complexity of parallel frequency domain IC by about 80.5%.

An embodiment of a reconfigurable multi-standard uplink MIMO receiver can thus support both HSPA/HSPA+ and LTE/LTE-A systems. An embodiment of a reconfigurable receiver can save up to 66.9% in complexity employing two low-complexity partial iterative IC processes to reduce residual interference of a reconfigurable receiver. Processes can generally provide up to 2 dB gain in SNR in both standards compared to full IC but with only 15.2% additional complexity.

Figure 9:
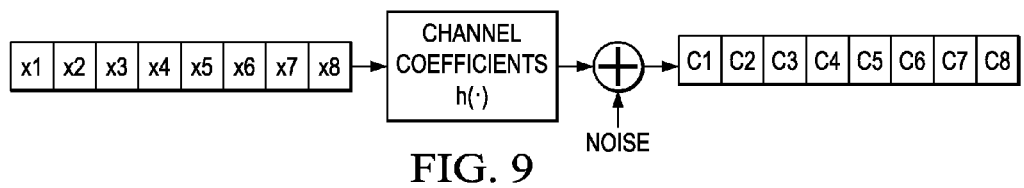
FIG. 9 illustrates a graphical representation of a sequence of transmitted spread chips that pass through a channel with an impulse response.

Turning now to FIG. 9, illustrated is a graphical representation of a sequence of transmitted spread chips, x1, x2, . . . , x8, that pass through a channel with impulse response $h(\cdot)$. Noise is added by the channel to produce received spread chips C1, C2, . . . , C8 with added noise.

Figure 10:
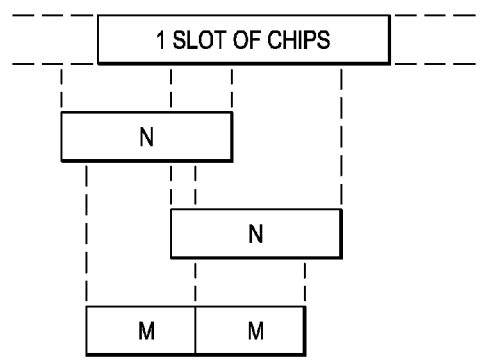
FIG. 10 illustrates a graphical representation of overlap and cut employed for frequency domain equalization, illustrating a process employed in an embodiment.

Turning now to FIG. 10, illustrated is a graphical representation of overlap and cut employed for frequency domain equalization, illustrating a process employed in an embodiment. In the frequency domain, a slot of chips is partially processed with a DFT as a group of N chips which does not span the slot, and are processed further with an overlapping group of N chips, which again do not span slot. The parameter N is the size of the DFT. Overlapping chips of the two groups of N chips are cut to produce non-overlapping groups of M chips that remain after the overlap/cut process.

Partial interference cancellation is now further described. For iterative partial single-chip and multi-chip IC for UMTS, a received signal can be represented by equation (34):

$$y_{eq}(t) = h_{eq}(0)x(t) + \sum_{i=1}^{M-1} h_{eq}(i)x(t-i) + n_{eq}(t). \quad (34)$$

The first term of equation (34) represents transmitted chips. The second term represents residual interference from the other $(M-1)N_T$ previous chips at all antennas.

To despread $y_{eq}(t)$ without employing traditional IC, the despreading module of each user in an embodiment converts $y_{eq}(t)$ and the rest of the chips in the same symbol into a single symbol. The equation is $$y_s(p+1) = \frac{1}{L_{SF}} \sum_{i=1}^{L_{SF}} a(i) y_{eq}(pL_{SF} + i),$$

where $y_s(p+1)$ is the $(p-1)^{th}$ $N_T \times 1$ vector of symbols, $L_{SF}$ is the length of the spreading factor, and $a(i)$ is the $i^{th}$ element of the spreading factor. At each time, $N_T$ chips are despread to $N_T N_U$ symbols, where $N_U$ is the number of users.

In an embodiment of partial single chip IC for multimode receiver when equalized time domain chips arrive, cancellation is performed using equation (35)

$$y_{ic}(t) = f(y_{eq}(t) - y_{ri}(t)) \quad (35)$$
$$= f(h_{eq}(0)x(t) + n_{eq}(t)),$$

where $y_{ic}(t)$ is an $N_T \times 1$ vector of chips after IC at time t, the function f is an $N_T \times N_T$ normalization matrix that will be described later, and $y_{ri}(t)$ is an $N_T \times 1$ vector of regenerated interference at time t. The signal $y_{ri}(t)$ is generated by equation (36)

$$y_{ri}(t) = \sum_{i=1}^{L_{FB}} h_{eq}(i) c(t-i), \quad (36)$$

where $L_{FB}$ is the number of previously detected chips used in the interference regenerator, and $c(t-i)$ is an $N_T \times 1$ vector of detected chips at time $(t-i)$.

An MMSE criterion is applied to $y_{ic}(t)$ by choosing the function f as $$f = h_{eq}(0)^H (h_{eq}(0) h_{eq}(0)^H C_{noise})^{-1}, \quad (37)$$

where $C_{noise}$ is the covariance of the equalized noise $n_{eq}(t)$, which is $$C_{noise} = E[n_{eq}(t) n_{eq}(t)^H]. \quad (38)$$

Next, the despreading module of each user converts $y_{ic}(t)$ with the rest of the chips in the same symbol into a single symbol. The equation is $$y_s(p+1) = \frac{L}{L_{SF}} \sum_{i=1}^{L_{SF}} a(i) y_{ic}(pL_{SF} + i), \quad (39)$$

where $y_s(p+1)$ is the $(p+1)^{th}$ $N_T \times 1$ vector of symbols, $L_{SF}$ is the length of the spreading factor, and $a(i)$ is the $i^{th}$ element of the spreading factor. Each time, $N_T$ chips are despread to $N_T \times N_U$ symbols, again where $N_U$ is the number of users.

In an example of single-chip cancellation such as at a time 5, only C5 performs cancellation by using past chips and then performs despreading. Then C5_mmse, C6 C7, C8 are despread together into one symbol.

With reference to FIG. 7, an example of received chips in a four-tap channel is:

$$C5 = h(0)*x5 + h(1)*x4 + h(2)*x3 + h(3)*x2 + n5,$$

$$C6 = h(0)*x6 + h(1)*x5 + h(2)*x4 + h(3)*x3 + n6,$$

$$C7 = h(0)*x7 + h(1)*x6 + h(2)*x5 + h(3)*x4 + n7, \text{ and}$$

$$C8 = h(0)*x8 + h(1)*x7 + h(2)*x6 + h(3)*x5 + n8,$$

where the last four terms in each of the equations above represent interference and noise.

To perform SCIC: for chip C5, chips before C5 are detected as x'1, x'2, x'3, and x'4, and the following steps are executed:

Step 1: perform IC using C5_new=C5−h(1)*x'4−h(2)*x'3−h(3)*x'2

Step 2: perform MMSE TDE on C5_new

Step 3: despread C5_new after MMSE, C6, C7, and C8 together into one symbol

Step 4: detect the symbol

Step 5: spread the detected symbol into chips

The same flow is performed for chips C6, C7, and C8.

In the above process, during despreading of C5_new, C6_new, C7_new, and C8_new after MMSE into one symbol, interference from x3, x4 still exists in C6, C7 and C8. Multi-chip IC can be employed to remove further interference.

When $N_T$ equalized time domain chips arrive at time t, cancellation is performed with future arriving chips by $$y_{ic}(t+j) = f(y_{eq}(t+j) - y_{ri}(t+j)) \quad (40)$$

$$= f(h_{eq}(0)x(t+j) + \sum_{i=1}^{j} h_{eq}(i)x(t+j-i) + n_{eq}(t+j)),$$

$$(j = 0 \sim (p+1)L_{SF} - t)$$

where $y_{ic}(t+j)$ is an $N_T \times 1$ vector of chips after IC at time t+j, the function f is an $N_T \times N_T$ normalization matrix to be described later, and $y_{ri}(t+j)$ is an $N_T \times 1$ vector of regenerated interference at time t+j. When j=0, the equation above becomes equation (8).

The $N_T \times 1$ vector $y_{ri}(t+j)$ is generated by equation (41)

$$y_{ri}(t+j) = \sum_{i=j+1}^{L_{FB}} h_{eq}(i)c(t+j-i), \quad (41)$$

$$(j = 0 \sim (p+1)L_{SF} - t)$$

where $L_{FB}$ is the number of previous detected chips used in the interference regenerator.

Next, the despreading module of each user converts $y_{ic}(t)$ and the rest of the chips in the same symbol into a single symbol as indicated by equation (39).

In an example, in multi-chip cancellation such as at time "5," chips C5, C6, C7, and C8 all perform cancellation by using past chips. Then, chips C5, C6, C7, and C8 are despread after performing MMSE.

With reference again to FIG. 9, an example of received chips in a four-tap channel is:

$$C5 = h(0)*x5 + h(1)*x4 + h(2)*x3 + h(3)*x2 + n5,$$

$$C6 = h(0)*x6 + h(1)*x5 + h(2)*x4 + h(3)*x3 + n6,$$

$$C7 = h(0)*x7 + h(1)*x6 + h(2)*x5 + h(3)*x4 + n7, \text{ and}$$

$$C8 = h(0)*x8 + h(1)*x7 + h(2)*x6 + h(3)*x5 + n8,$$

where the last four terms in each of the equations above represent interference and noise.

To perform MCIC: for chip C5, chips before C5 are detected as x'1, x'2, x'3, and x'4, and the following steps are executed:

Step 1: perform IC using: C5_new=C5−h(1)*x'4−h(2)*x'3−h(3)*x'2

C6_new=C6−h(2)*x'4−h(3)*x'3

C7_new=C7−h(7)*x'4

C8_new=C8

Step 2: perform MMSE TDE on C5_new

Step 3: despread C5_new after MMSE, C6, C7, and C8 together into one symbol

Step 4: detect the symbol

Step 5: spread the detected symbol into chips.

The same flow is performed for chips C6, C7, and C8.

In iterative partial IC for LTE/LTE-A, the equalized time domain symbols of each user are directly written as equation (42)

$$y_{eq}(t) = h_{eq}(0)x(t) + \sum_{\substack{i=j-M+1 \\ i \neq 0}}^{j} h_{eq}(i)x(t-i) + n_{eq}(t), \quad (42)$$

where $y_{eq}(t)$ is an $N_T \times 1$ vector of equalized time domain symbols at time t, j is equal to (t mod M), $h_{eq}(i)$ is an $N_T \times N_T$ equalized time domain channel matrix at tap i, $h_{eq}(M+i)=h_{eq}(i)$, and $n_{eq}(t)$ is an $N_T \times 1$ vector of equalized time domain additive white Gaussian noise at time t. The first term in the equation above represents transmitted symbols. The second term represents residual interference from the other (M−1)$N_T$ symbols in the same IDFTs at all antennas. This term can be minimized by regenerating the interference from $h_{eq}(i)$ and detected symbols. Because there is no spreading factor, the two IC processes in HSPA/HSPA+ become a single equivalent partial IC in LTE/LTE-A.

When $N_T$ equalized time domain symbols of each user arrive, IC is performed using equation (34). Next, without despreading, the symbols are directly detected.

The interference regenerator then produces interference from the detected symbols at all antennas by equation (43)

$$y_{ri}(t) = \sum_{\substack{i=-L_{FF} \\ i \neq 0}}^{L_{FB}} h_{eq}(i)s(t-i), \quad (43)$$

where $L_{FF}$ is the number of future detected symbols used in the interference regenerator. However, these symbols are not received in the future, but have already been received and buffered. When LFB+LFF=M−1, the residual interference is regenerated from all other M−1 symbols in the same IDFT, which is full regeneration. As in HSPA/HSPA+, by adjusting $L_{FB}+L_{FF}$ to only cover strong interference, complexity can be reduced without receiver performance loss, and less data storage is needed.

For example, in LTE, such as at time 5, interference on chip C5 is performed using nearby detected samples.

With reference again to FIG. 7, an example of received chips in a four-tap channel is:

$$C5=h(0)*x5+h(1)*x4+h(2)*x3+h(3)*x2+H(N-1)*x6+h(N-2)*x7+\ldots+n5,$$

$$C6=h(0)*x6+h(1)*x5+h(2)*x4+h(3)*x3+H(N-1)*x7+h(N-2)*x8+\ldots+n6,$$

$$C7=h(0)*x7+h(1)*x6+h(2)*x5+h(3)*x4+H(N-1)*x8+h(N-2)*x9+\ldots+n7,$$

$$C8=h(0)*x8+h(1)*x7+h(2)*x6+h(3)*x5+H(N-1)*x9+h(N-2)*x8+\ldots+n8,$$

where the last six terms in each of the equations above represent interference and noise.

To perform interference cancellation with N-IDFT: For chip C5, samples before chip C5 are first detected as x'3, x'4, x'5, x6, and x'7, and the following steps are executed:

Step 1: perform IC using C5_new=C5−h(1)*x'4−h(2)*x'3−h(3)*x'2−h(N−1)*X'6−h(N−2)*x'7

Step 2: perform MMSE TDE on C5_new

Step 3: detect the symbol from C5_new

The same flow is performed for chips C6, C7, and C8.

Thus, an embodiment reduces complexity by re-using the equalizer coefficient matrix A calculated in FDE to calculate the covariance of the equalized noise $C_{noise}$, calculating the covariance of the equalized noise $C_{noise}$ in the frequency domain by using the equalizer coefficient matrix A, so there is no need to convert A into the time domain, constructing a two-mode interference regenerator is reconfigurable for UMTS and LTE, and performing partial interference cancellation using only a partial IDFT. When compared to a full DFT used for frequency-domain IC, complexity is reduced. For frequency-domain IC, chips and symbols are converted into the frequency domain using a number $N_T$ of DFTs. A number $N_T^2$ of IDFTs is used to convert the equalized channel matrix $H_{eq}$ into the time domain for use in the interference regenerator. Since partial IC only uses part of $H_{eq}$, for example h(0) . . . h($L_{FB}$), a full IDFT is not used, thereby saving complexity. For UMTS, the DFTs for feedback can be shared because there is sufficient user separation after despreading. For LTE, sharing is not necessary, and each user can use its own set of DFTs for feedback.

Compared to the use of a full DFT for frequency-domain IC, a partial mixed-radix IDFT reduces complexity. For frequency-domain IC, chips and symbols are converted into the frequency domain using $N_T$ DFTs. For UMTS, the DFTs for feedback can be shared because there is sufficient user separation after despreading. For LTE, sharing is employed and each user can have its own set of DFTs for feedback.

To perform IC in the time domain, a number $N_T^2$ of IDFTs is used to convert the equalized channel matrix $H_{eq}$ into the time domain for use in the interference regenerator. Since partial IC only uses part of h, for example h(0) . . . h($L_{FB}$), a full IDFT is not needed, as illustrated by the equation below:

$$h(n) = \frac{1}{N}\sum_{k=0}^{N-1} H\_eq(k)\cdot e^{+i2\pi\frac{k}{N}n},$$

where n is from 0 to $L_{FB}$ and from (N−$L_{FF}$−1) to (N−1)

From the equation above, silicon complexity can be reduced using partial state IDFT with mixed radix.

Because the feedback signal does not need to be transformed to the frequency domain to perform IC, the processing time to execute the DFTs and IDFTs is saved.

IC embodiments can improve performance against not using IC by about 2 dB SNR. IC embodiments also exhibit 0.5 dB gain over parallel frequency domain IC. Embodiments can exhibit only minor receiver performance loss compared with full IC, and have performance close to perfect IC. Accordingly, cancelling only strong interference does not substantially degrade receiver performance.

Embodiments of partial interference cancellation can thus support both LTE/LTE-A and HSPA/HSPA+ standards. In HSPA/HSPA+ embodiments operate at the chip level, while in LTE/LTE-A embodiments can operate at a symbol level, which is very useful to a FDE-based multi-mode receiver requiring less area to support multiple standards.

Embodiments of interference cancellation not only work in SISO systems, but are also operative in MIMO systems. Embodiments not only can cancel inter-chip or inter-symbol interference, but can also cancel inter-antenna interference.

Figure 15:
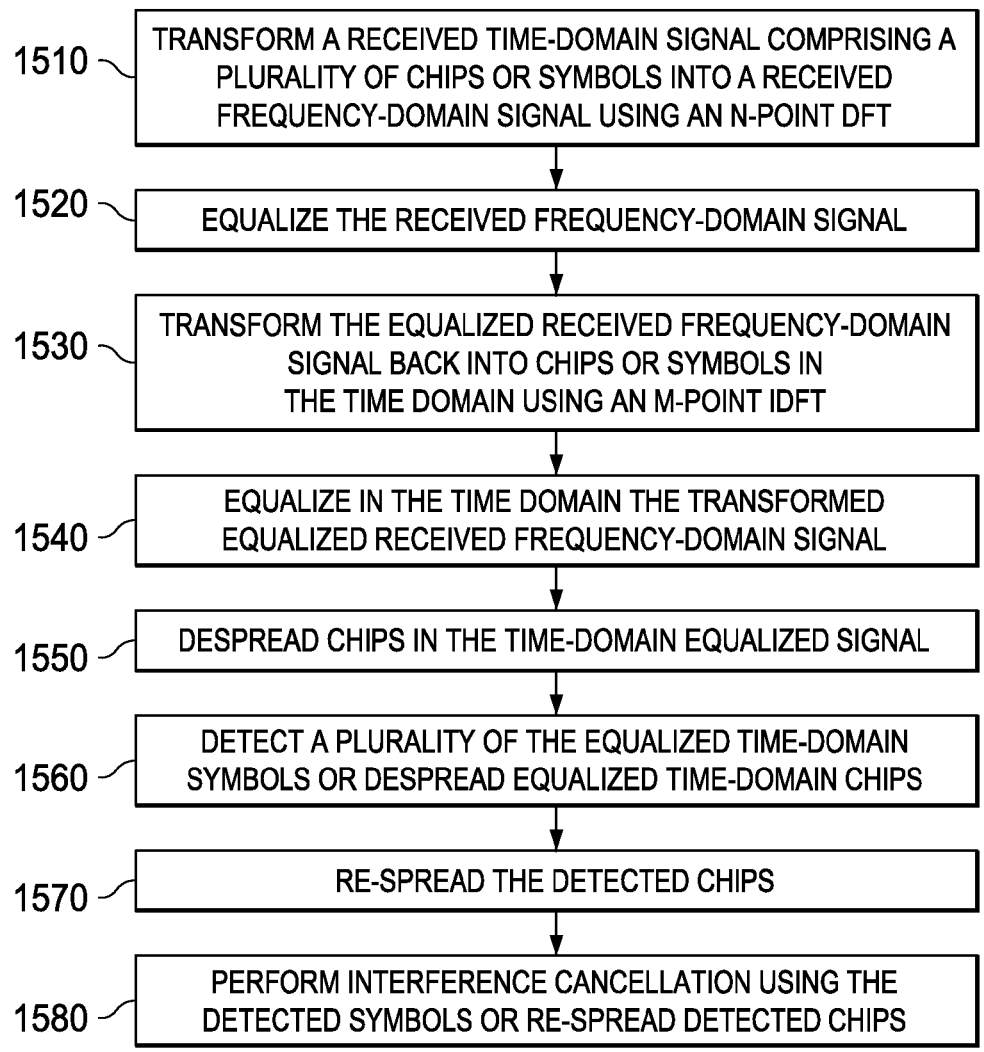
FIG. 15 illustrates a block diagram of a process flow for performing interference cancellation on a received wireless signal in a receiver in accordance with an embodiment.

Turning now to FIG. 15, illustrated is a block diagram of a process flow for performing interference cancellation on a received wireless signal in a receiver in accordance with an embodiment. The receiver can be formed to operate under a plurality of wireless standards. The received time-domain wireless signal is supplied to block or step 1510 that transforms the received signal comprising a plurality of chips or symbols in the time-domain into a received frequency-domain signal using an N-point DFT. The received signal can be a multi-input/multi-output signal. The signal that was received can be formed, without limitation, under LTE or UMTS standards.

In block or step 1520, the received frequency-domain signal is equalized. The equalization can be performed, without limitation, using a minimum mean-square error criterion. In block or step 1530, the equalized received frequency-domain signal is transformed back into chips or symbols in the time domain using an M-point IDFT. The parameter M can be the same or different from the parameter N.

In block or step 1540, the transformed equalized received frequency-domain signal is equalized in the time domain. In block or step 1550, chips in the time-domain equalized signal are despread. In block or step 1560, the equalized time-domain symbols or despread equalized time-domain chips are detected. A plurality of equalized time-domain symbols or despread equalized time-domain chips can be detected.

In block or step 1570, detected chips are re-spread. In block or step 1580, interference cancellation is performed using the detected symbols or re-spread detected chips. In an embodiment, the interference cancellation is performed using a partial result produced by an IDFT. The partial interference cancellation can be performed using only neighboring detected symbols or re-spread detected chips.

To provide an efficient receiver structure that can be used for both LTE and UMTS standards, embodiments of four further types of inter-chip and inter-antenna interference cancellation processes are now described. Processes in these embodiments spread detected symbols into chips and feed the chips back to an interference cancellation filter and perform noise cancellation on the incoming chip. The four processes are "scheme1" (single chip cancellation), "scheme2" (chip normalized multi-chip cancellation), "scheme3" (symbol normalized multi-chip cancellation), and "scheme4" (zero-forcing ("ZF") normalized multi-chip cancellation). These processes can bring a gain of a few dB in SNR. Scheme2, scheme3, and scheme4 can especially provide improvement in a low SNR range. Compared to existing processes, processes introduced herein can be constructed with less area, less latency, and can be applied in a multi-input/multi-output ("MIMO") system.

Returning to FIG. 6, to produce an efficient receiver structure that can be used for both LTE and UMTS systems, further inter-chip and inter-antenna interference cancellation embodiments are introduced. Four of these embodiments are scheme1 (single chip cancellation), scheme2 (chip normalized multi-chip cancellation), scheme3 (symbol normalized multi-chip cancellation), and scheme4 (ZF ("zero forcing") normalized multi-chip cancellation).

For each chip, the receiver performs despreading to the current chip and performs symbol detection that includes the current chip. After symbol detection, the detected symbol is spread in block 680 to the chip level. Then the spread chips are inputted to an interference cancellation filter/regenerator 690. The output of the interference cancellation filter/regenerator 690 is subtracted from the incoming chip to perform interference cancellation. The coefficients of the feedback filter are calculated in the frequency domain.

In one example, inter-chip and inter-antenna interference cancellation embodiments can be used in a MIMO system. In a MIMO system, interference cancellation is applied to each of possibly plural antenna chains. In interference cancellation filter/regenerator 690, inter-chip and inter-antenna interference are calculated for all antennas. The outputs of the interference cancellation filter/regenerator 690 are used to cancel incoming chips in all antennas.

After bypassing the despreading and spreading modules, the same structure can be applied to an LTE system. In UMTS, cancellation operates at the chip level, while in LTE the system operates at a symbol level.

An $M_T \times M_R$ MIMO system with $M_T$ transmitter and $M_R$ receiver antennas is assumed. "Y" represents a received chip signal that is spread from a symbol with a corresponding spreading code. After applying an $N_{DFT}$ point fast/discrete Fourier transform ("FFT"/"DFT"), Y is transformed into $\hat{Y}$ in the frequency domain. Then minimum mean-squared error ("MMSE") frequency domain equalization is applied to $\hat{Y}$ on each frequency subcarrier to obtain equalized signal $\hat{Y}_{eq}$, which is an $N_{IFFT} \times NT$ matrix. $\hat{H}_{eq}$ is an $N_{IFFT} \times N_T^2$ matrix. For simplicity, perfect channel estimation is assumed. After that, $N_{FFT}$ point inverse fast/discrete Fourier transform ("IFFT"/"IDFT") converts $\hat{Y}_{eq}$ back to the time domain as $Y_{eq}$. Then an overlap and cut process is used, so that only the middle portion of $Y_{eq}$ is kept. Next, in the time domain, a cancellation process is applied to cancel interference from other chips. The detected symbol is spread and inputted to a feedback filter with frequency domain coefficients. The output of the feedback filter is used as interference and removed from the incoming chip.

The FDE computes the $M_T \times 1$ equalized received vector, $\hat{y}_{eq}(n)$ using equation (18):

$$\hat{y}_{eq,(n)} = (\hat{H}_{(n)}^H \hat{H}_{(n)} + \sigma^2 I)^{-1} \hat{H}_{(n)}^H \hat{y}_{(n)}, \quad (18)$$

where $\hat{H}_{(n)}$ corresponds to the frequency domain channel in the nth sub-channel, and $\hat{y}_{(n)}$ is the corresponding frequency domain received vector in the nth sub-channel for $n=\{1, 2, \ldots, N_{IFFT}\}$.

The $M_T \times M_T$ equalized frequency domain channel is computed by equation (19):

$$\hat{H}_{eq,(n)} = (\hat{H}_{(n)}^H \hat{H}_{(n)} + \sigma^2 I)^{-1} \hat{H}_{(n)}^H \hat{H}_{(n)}. \quad (19)$$

The time domain equalized signal and matrix are given by equations (3) and (4):

$$Y_{eq} = \text{IFFT}^{(N_{IFFT})} \{\hat{Y}_{eq}\}, \quad (20)$$

$$H_{eq} = \text{IFFT}^{(N_{IFFT})} \{\hat{H}_{eq}\}, \quad (21)$$

where $\hat{Y}_{eq} = [\hat{y}_{eq,(1)}, \ldots, \hat{y}_{eq,(n)}]$. Also, $\hat{Y}_{eq}$ and $\hat{H}_{eq}$ are $N_{IFFT} \times 1$ arrays, and the $\text{IFFT}^{(N_{IFFT})}\{\cdot\}$ computes the $N_{IFFT}$-point IFFT of every row of its input matrix. Essentially, equations (20) and (21) are IFFTs of the equalized signals for each antenna. $Y_{eq}(m)$ and $H_{eq}(m)$ are $N_{IFFT} \times 1$ arrays.

Time-domain interference cancellation is now described. The function $f(\cdot)$ and the variable $g_m$ are described later hereinbelow.

Equation (22) cancels the interference with the known chips. "p" is number of detected symbols. "q" is from 1 to spreading factor $N_{SF}$, and the function $f(\cdot)$ is the normalization function which is defined in more detail later hereinbelow.

$$y_{eq}(m,pN_{SF}+q) = f(y_{eq}(m,pN_{SF}+q) - \Sigma_{i=1}^{M_T} \Sigma_{j=1}^{N_{FB}} H_{eq} \\ ((m-1)M_T+i, j+1) \cdot y_{fb}(i,pN_{SF}+q-j)) \quad (22)$$

In single-chip cancellation, equation (22) is applied to the current chip $pN_{SF}+q$. In multi-chip cancellation, equation (22) is applied to all chips from $pN_{SF}+q$ to $pN_{SF}+N_{SF}$ for the current chip $pN_{SF}+q$.

Equation (23) is employed to detect the symbol that consists of the current chip, and the spreading vector $a(m,i)$, $(i=1, \ldots, N_{SF})$, is the spreading vector for the $m^{th}$ channel. The function $g_m(\cdot)$ is a normalization function, and $\lfloor \cdot \rfloor$ maps the symbol to its closest modulation point.

$$s(m,p+1) = \lfloor g_m(\Sigma_{i=1}^{N_{SF}} a(m,i) \cdot y_{eq}(m,pN_{SF}+i)) \rfloor, \quad (23)$$

Equation (24) below respreads the detected symbol to detected chips.

$$y_{fb}(m,pN_{SF}+q) = \Sigma_{i+1}^{M_T} a(i,q) \cdot s(i,p+1) \quad (24)$$

For each of the four different process, the functions $f(\cdot)$ and $g_m(\cdot)$ are different, as listed below.

Scheme1 relates to single-chip cancellation. This process only cancels the interference in the current chip.

$$f(x) = x, g_m = 1 \quad (25)$$

Scheme2 relates to chip-normalized multi-chip cancellation. This process cancels interference in the current and following chips with the detected symbols. After cancellation, the current chip becomes $\Sigma_{i=1}^{M_T} H_{eq}((m-1)M_T+i,1) \cdot$ transmitted_chip+noise. Because $H_{eq}((m-1)M_T i,1), i \neq m$ are small, by ignoring them the current chip should be normalized by $1/H_{eq}(m,1)$.

$$f(x) = x/H_{eq}(m,1), \quad (26)$$

$$g_m = 1 \quad (27)$$

Scheme3 relates to symbol-normalized multi-chip cancellation. This process cancels interference in the current and following chips with the detected symbols. After cancellation, the current chip becomes $\Sigma_{i=1}^{M_T} H_{eq}((m-1)M_T+i,1) \cdot$ transmitted_chip+noise. Different from the chip-normalized multi-chip cancellation process, by not ignoring $H_{eq}((m-1)M_T+i,1), i \neq m$, and performing the normalization on a symbol after despreading, the current chip can be normalized by the following function.

$$f(x) = x, \quad (28)$$

$$g_m = 1/\Sigma_{i=1}^{N_{SF}} a(m,i) \Sigma_{j=i}^{N_{SF}} a(m,j) \cdot H_{eq}(m,j-i+1), \quad (29)$$

Scheme4 relates to ZF normalized multi-chip cancellation. After cancellation, the current chip becomes $\Sigma_{i=1}^{M_T} H_{eq}((m-1) \cdot$ transmitted_chip+noise. Different from a chip-normalized multi-chip cancellation process, by not ignoring $H_{eq}((m-1)M_T+i,1), i \neq m$, the current chip should be normalized by the following function:

$$H_{ZF} = \begin{pmatrix} H_{eq}(1,1) & & 0 & H_{eq}(M_T,1) & & 0 \\ \vdots & \ddots & & \vdots & \ddots & \\ H_{eq}(1,N_{SF}) & \cdots & H_{eq}(1,1) & H_{eq}(M_T,N_{SP}) & \cdots & H_{eq}(M_T,1) \\ \vdots & & \ddots & \vdots & & \ddots \\ H_{eq}(M_T M_T - M_T + 1, 1) & & 0 & H_{eq}(M_T M_T, 1) & & 0 \\ \vdots & \ddots & & \vdots & \ddots & \\ H_{eq}(M_T M_T - M_T + 1, N_{SF}) & \cdots & H_{eq}(M_T M_T - M_T + 1, 1) & H_{eq}(M_T M_T, N_{SF}) & \cdots & H_{eq}(M_T M_T, 1) \end{pmatrix}^{-1} \quad (30)$$

$$X = \begin{pmatrix} x_{(pN_{SF}+1)} \\ \vdots \\ x_{(pN_{SF}+N_{SF})} \end{pmatrix} \quad (31)$$

$$f(x_{(pNSF+q)}) = e_q^T H_{ZF} X, \quad (32)$$

where $e_q^T$ is a row zero vector with its q-th element equal to 1.

$$g_m = 1, \quad (33)$$

Figure 11:
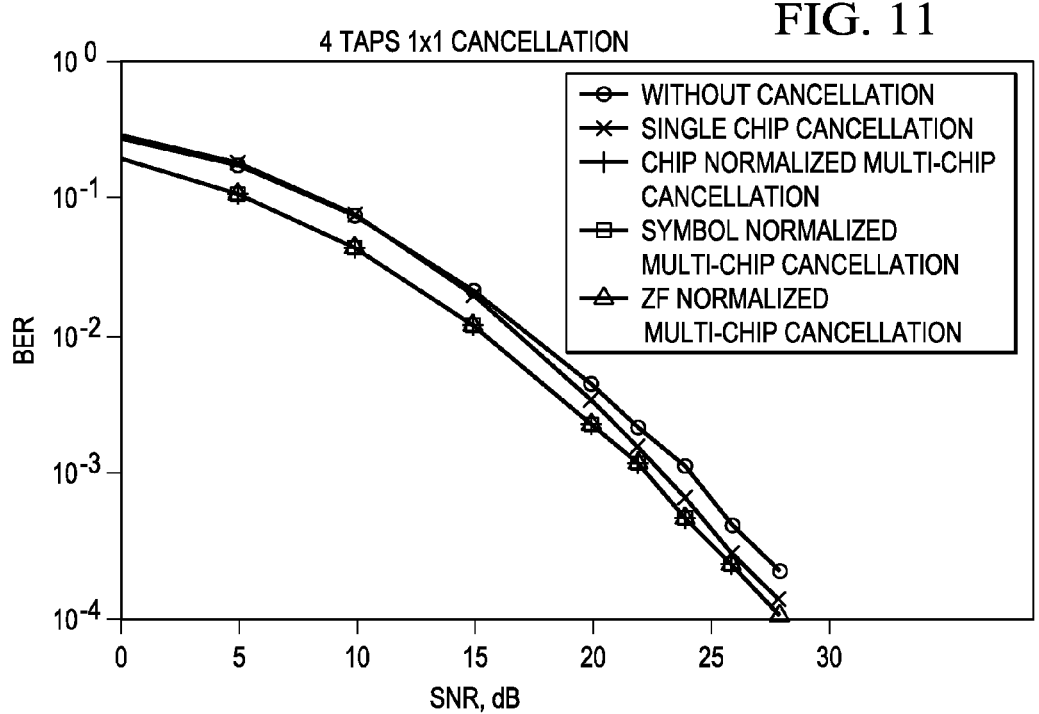
FIGS. 11-14 illustrate graphical representations of receiver performance of embodiments in random channels.
Figure 12:
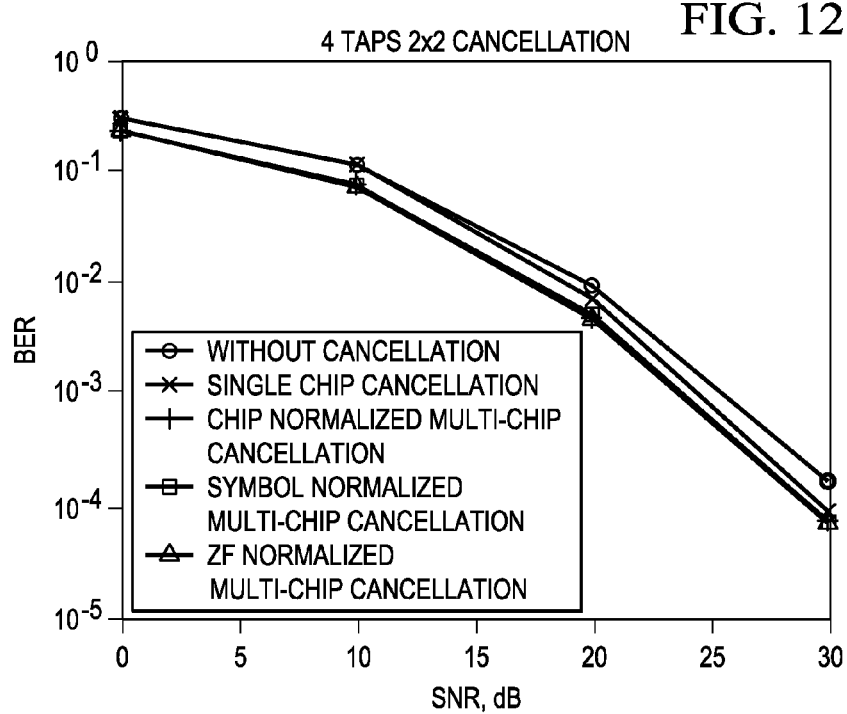
Figure 13:
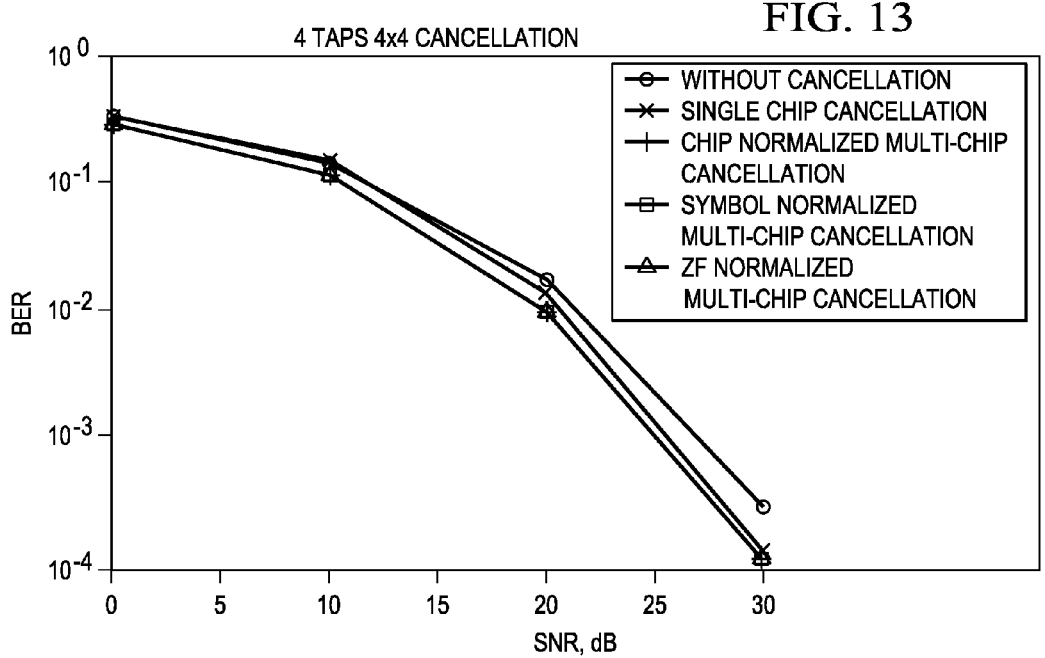

Graphical representations of receiver performance of the four different embodiments in random channels are shown in FIGS. 11-13. The simulation conditions are:

1×1 SISO (single input/single output), 2×2 MIMO, 4×4 MIMO
Spreading factor vector of [2 2 4 4]
16-QAM modulation
4-tap channel: [0 −4.7712 −7.7815 −7.7815] dB
Nc=512
Mc=100
Feedback filter length=8.

As shown in FIGS. 11-13, independent of a 1×1, 2×2 or 4×4 system, scheme1 (single-chip cancellation) has 2 dB gain in the high SNR range. Scheme2 (chip-normalized multi-chip cancellation), scheme3 (symbol normalized multi-chip cancellation) and scheme4 (ZF normalized multi-chip cancellation) produce more SNR gain in the low SNR range than scheme1.

Figure 14:
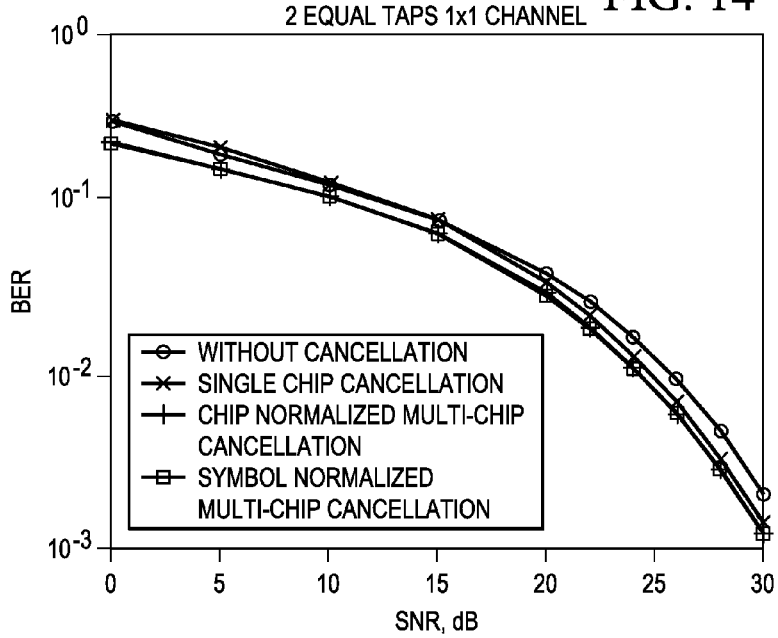

The inter-chip and inter-antenna interference cancellation processes also improve the performance in an equal-taps channel, as shown in FIG. 14. The simulation conditions are:

1×1 SISO
spreading factor vector of [2 2 4 4]
16-QAM modulation
2 equal-taps channel: [0 0] dB
Nc=512
Mc=100
feedback filter length=8.

As shown in FIG. 14, scheme1 (single-chip cancellation) has 1 dB gain in the high SNR range. Scheme2 (chip normalized multi-chip cancellation) and scheme3 (symbol normalized multi-chip cancellation) produce more gain in the low SNR range than scheme1.

As discussed hereinabove, embodiments can be used in a system that uses FDE in the UMTS system instead of a G-RAKE receiver, which makes construction of a multi-mode receiver possible.

A G-RAKE receiver is used in a current UMTS base station. The structure, which is similar to the structure shown in FIG. 4, includes J fingers, each correlating to a different delay of the received signal. The finger outputs are then combined to form a decision statistic. The structure is the same as the traditional RAKE receiver, but with different parameters (number of fingers, finger delays, and combining weights). To tune these parameters, a G-RAKE receiver requires more computation than a RAKE receiver. Generally, a G-RAKE can perform much better than a RAKE receiver.

On the other hand, FDE is used in LTE systems. As illustrated and described with reference to FIG. 2, a cyclic prefix is removed from the received signal, and then the received signal is converted into the frequency domain. After subcarrier de-mapping and equalization in the frequency domain, the signal is converted back the time domain.

To support both LTE and UMTS standards, a base station would traditionally have both a G-RAKE receiver for UMTS and an FDE receiver for LTE. However, this results in huge silicon area. Existing publications show that an FDE-based receiver would be a good choice to support both UMTS and LTE standards with less complexity. To apply FDE in UMTS, where there is no CP, overlap-cut can be used as illustrated and described with reference to FIG. 5. By combining overlap and cut with FDE, the resulting system is as shown in FIG. 6. The N received symbols are sent to N-point DFT 220, and then the middle M symbols are kept and sent to despreader 360.

Embodiments provide a number of advantages and unique features. For example, the performance of a system using concepts described herein can be improved. Inter-chip and inter-antenna interference cancellation processes can improve the performance of FDE in UMTS. For example, Scheme1 (single chip cancellation) has 2-3 dB gain in the high SNR range. Scheme2 (chip normalized multi-chip cancellation), scheme3 (symbol normalized multi-chip cancellation) and scheme4 (ZF normalized multi-chip cancellation) get more gain in the low SNR range than scheme1. The processes also improve the performance in equal taps channel.

Embodiments also provide multi-standard support. Embodiments of inter-chip and inter-antenna interference cancellation processes can support both LTE and UMTS standards. In UMTS they work in the chip level, while in LTE they can work in symbol level. This is very useful to a FDE based multi-mode receiver, which requires less area to support multiple standards.

Embodiments provide MIMO support. The interference cancellation processes introduced herein works not only in an SISO system, but also in an MIMO system. They not only can cancel inter-chip interference, but also cancel inter-antenna interference.

Embodiments can also be implemented and utilized at a lower cost. Compared to other cancellation methods, which work in frequency domain, embodiments have less computational complexity. This is because processes introduced herein do not feed the chips back to the frequency domain, which requires FFT and leads to longer feedback processing latency. Moreover, the processes introduced herein calculate a coefficient of the feedback filter in the frequency domain instead of in the time domain.

Embodiments perform with lower latency. Inter-chip and inter-antenna interference cancellation as introduced herein works in the time domain. Compared to other processes which work in the frequency domain, there is no need to convert a chip back to the frequency domain. This shortens the feedback loop and preserves lower latency.

Embodiments can be used with a number of products or services. In one example, a multimode receiver that supports both UMTS and LTE can be implemented. In an another example, an FDE receiver can be implemented for UMTS. These technologies can be used for next-generation multi-mode base stations supporting macro-, pico-, and micro-cells.

Embodiments can improve the performance of FDE by cancelling inter-chip and inter-antenna interference, especially in a low SNR range. This can be accomplished with reduced complexity of a multimode receiver with decision feedback for real-time implementation. Embodiments of the cancellation processes cancel both inter-chip and inter-antenna interference, have less latency compared to other solutions, and have less area compared to other solutions.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is therefore intended that the appended claims encompass any such modifications or embodiments.

What is claimed is:

1. A method for operating a wireless receiver, the method comprising:
   equalizing, by the receiver, a frequency-domain received signal;
   converting the equalized frequency-domain received signal to a time-domain received signal;
   equalizing, by the receiver, the time-domain received signal;
   detecting a plurality of symbols of the equalized time-domain received signal; and
   performing interference cancellation on the equalized time-domain received signal using the detected plurality of symbols, wherein the interference cancellation comprises inter-antenna interference cancellation.

2. The method as recited in claim 1 further comprising despreading the equalized time-domain received signal after the equalizing the time-domain received signal.

3. The method as recited in claim 2 further comprising re-spreading the detected plurality of symbols after the detecting the plurality of symbols of the equalized time-domain received signal.

4. The method as recited in claim 1 wherein the performing the interference cancellation comprises using a partial result produced by an inverse discrete Fourier transform ("IDFT").

5. The method as recited in claim 4 wherein the performing the interference cancellation comprises performing partial interference cancellation using the partial result produced by the IDFT.

6. The method as recited in claim 1 wherein the performing the interference cancellation comprises performing partial interference cancellation from neighboring symbols in the detected plurality of symbols.

7. The method as recited in claim 1 further comprising producing the time-domain received signal using an IDFT.

8. The method as recited in claim 1 wherein the interference cancellation is performed on a single chip of the detected plurality of symbols.

9. The method as recited in claim 1 wherein the time-domain received signal is produced under Long Term Evolution ("LTE") standards.

10. The method as recited in claim 1 wherein the wireless receiver is operable under a plurality of wireless standards.

11. The method as recited in claim 1 wherein the time-domain received signal is a multi-input/multi-output signal.

12. The method as recited in claim 1 wherein the equalizing the time-domain received signal comprises employing a minimum mean square error criterion.

13. A wireless receiver comprising:
   a memory; and
   a processor coupled to the memory, the processor configured to:
     equalize a frequency-domain received signal;
     convert the equalized frequency-domain received signal to a time-domain received signal;
     equalize the time-domain received signal,
     detect a plurality of symbols of the equalized time-domain received signal, and
     perform interference cancellation on the time-domain received signal using the detected plurality of symbols, wherein the interference cancellation comprises inter-antenna interference cancellation.

14. The wireless receiver as recited in claim 13 wherein the processor is further configured to despread the equalized time-domain received signal after the equalize the time-domain received signal.

15. The wireless receiver as recited in claim 14 wherein the processor is further configured to re-spread the detected plurality of symbols after the detect the plurality of symbols of the equalized time-domain received signal.

16. The wireless receiver as recited in claim 13 wherein the processor is configured to use a partial result produced by an inverse discrete Fourier transform ("IDFT") to perform the interference cancellation.

17. The wireless receiver as recited in claim 16 wherein the processor is configured to use the partial result produced by the IDFT to perform the interference cancellation.

18. The wireless receiver as recited in claim 13 wherein the processor is configured to limit the interference cancellation to partial interference cancellation using only neighboring chips in the plurality of symbols.

19. The wireless receiver as recited in claim 13 wherein the processor is further configured to use an IDFT to produce the time-domain received signal.

20. The wireless receiver as recited in claim 13 wherein the processor is configured to perform the interference cancellation on a single symbol of the plurality of symbols.

21. The wireless receiver as recited in claim 13 wherein the time-domain received signal is produced under Long Term Evolution ("LTE") standards.

22. The wireless receiver as recited in claim 13 wherein the wireless receiver is operable under a plurality of wireless standards.

23. The wireless receiver as recited in claim 13 wherein the time-domain received signal is a multi-input/multi-output signal.

24. The wireless receiver as recited in claim 13 wherein the processor is configured to employ a minimum mean square error criterion to equalize the time-domain received signal.

* * * * *